(12) United States Patent
Kim et al.

(10) Patent No.: US 11,654,744 B2
(45) Date of Patent: May 23, 2023

(54) THERMAL MANAGEMENT SYSTEM FOR VEHICLE

(71) Applicants: HYUNDAI MOTOR COMPANY, Seoul (KR); KIA MOTORS CORPORATION, Seoul (KR)

(72) Inventors: Jae Yeon Kim, Hwaseong-si (KR); Man Hee Park, Suwon-si (KR); Jeawan Kim, Gwangmyeong-si (KR); Dong Seok Oh, Hwaseong-si (KR); Yeonho Kim, Seoul (KR)

(73) Assignees: HYUNDAI MOTOR COMPANY, Seoul (KR); KIA MOTORS CORPORATION, Seoul (KR)

(*) Notice: Subject to any disclaimer, the term of this patent is extended or adjusted under 35 U.S.C. 154(b) by 161 days.

(21) Appl. No.: 17/206,983

(22) Filed: Mar. 19, 2021

(65) Prior Publication Data

US 2022/0111698 A1   Apr. 14, 2022

(30) Foreign Application Priority Data

Oct. 12, 2020   (KR) .................. 10-2020-0130997

(51) Int. Cl.
*B60H 1/00* (2006.01)
*B60H 1/14* (2006.01)
*B60H 1/32* (2006.01)

(52) U.S. Cl.
CPC ..... *B60H 1/00392* (2013.01); *B60H 1/00007* (2013.01); *B60H 1/00278* (2013.01);
(Continued)

(58) Field of Classification Search
CPC ............ B60H 1/00392; B60H 1/00007; B60H 1/00278; B60H 1/00821; B60H 1/14;
(Continued)

(56) References Cited

U.S. PATENT DOCUMENTS 5,299,431 A * 4/1994 Iritani .................. B60H 1/3211
62/243
5,531,264 A * 7/1996 Eike .................... B60H 1/00914
237/12.3 B
(Continued)

FOREIGN PATENT DOCUMENTS

CN       103380339 B       8/2012
DE   102019109796 A1 * 12/2019   ......... B60H 1/00021
(Continued)

*Primary Examiner* — Ljiljana V. Ciric
(74) *Attorney, Agent, or Firm* — Lempia Summerfield Katz LLC

(57) ABSTRACT

A thermal management system for a vehicle adjusts a temperature of a battery module by using one chiller that performs heat exchange between a refrigerant and a coolant. The thermal management system includes: a cooling apparatus for circulating a coolant in a coolant line to cool an electrical component and an oil cooler provided in the coolant line; a battery cooling apparatus for circulating the coolant to the battery module; a chiller to cause heat exchange between the coolant and a refrigerant to control a temperature of the coolant; a heater that heats an interior of the vehicle using the coolant; and a first branch line connected to the coolant line between the oil cooler and a radiator through a first valve. In particular, a condenser included in the air conditioner is connected to the coolant line so as to pass the coolant circulating through the cooling apparatus.

20 Claims, 6 Drawing Sheets

(52) U.S. Cl.
CPC ........... B60H 1/00821 (2013.01); B60H 1/14 (2013.01); B60H 1/143 (2013.01); B60H 1/3211 (2013.01); B60H 2001/00307 (2013.01)

(58) Field of Classification Search
CPC .................. B60H 1/143; B60H 1/3211; B60H 2001/00307; B60H 1/00385; B60H 1/00885; B60H 1/2218; B60H 1/2225; B60H 1/3213; B60H 1/323; B60Y 2200/91; F25B 6/04
See application file for complete search history.

(56) References Cited

U.S. PATENT DOCUMENTS

| | | | | |
|---|---|---|---|---|
| 6,047,770 | A * | 4/2000 | Suzuki | B60H 1/3204 |
| | | | | 62/526 |
| 7,055,590 | B2 * | 6/2006 | Hara | B60H 1/00314 |
| | | | | 165/202 |
| 8,215,432 | B2 | 7/2012 | Nemesh et al. | |
| 8,635,882 | B2 * | 1/2014 | Malvicino | B60L 58/26 |
| | | | | 62/324.2 |
| 8,875,532 | B2 * | 11/2014 | Neumeister | B60L 3/0046 |
| | | | | 62/243 |
| 8,899,062 | B2 | 12/2014 | Kadle et al. | |
| 9,109,840 | B2 | 8/2015 | Kadle et al. | |
| 9,239,193 | B2 | 1/2016 | Kadle et al. | |
| 9,649,909 | B2 * | 5/2017 | Enomoto | B60W 10/30 |
| 10,252,597 | B2 * | 4/2019 | Wallace | B60L 58/27 |
| 10,611,212 | B2 * | 4/2020 | Kuroda | B60H 1/10 |
| 11,091,007 | B2 * | 8/2021 | Ferraris | B60L 58/27 |
| 11,325,445 | B2 * | 5/2022 | Kim | B60H 1/00007 |
| 11,407,275 | B2 * | 8/2022 | Durrani | B60H 1/3213 |
| 2013/0283838 | A1 | 10/2013 | Kadle et al. | |
| 2015/0101789 | A1 * | 4/2015 | Enomoto | B60H 1/039 |
| | | | | 236/35 |
| 2015/0273976 | A1 * | 10/2015 | Enomoto | B60L 3/0046 |
| | | | | 62/243 |
| 2016/0153343 | A1 * | 6/2016 | Kakehashi | B60H 1/3228 |
| | | | | 123/41.31 |
| 2016/0339761 | A1 * | 11/2016 | Enomoto | B60H 1/00899 |
| 2016/0339767 | A1 * | 11/2016 | Enomoto | F25B 25/005 |
| 2017/0021698 | A1 * | 1/2017 | Hatakeyama | F25B 25/005 |
| 2017/0028813 | A1 * | 2/2017 | Enomoto | B60H 1/00899 |
| 2017/0198946 | A1 * | 7/2017 | Takenaka | F25B 41/24 |
| 2017/0203635 | A1 * | 7/2017 | Kuroda | B60H 1/00342 |
| 2018/0117985 | A1 * | 5/2018 | Kim | B60H 3/024 |
| 2018/0354344 | A1 * | 12/2018 | Miura | B60H 1/08 |
| 2020/0189357 | A1 * | 6/2020 | Chopard | B60H 1/32281 |
| 2022/0111698 | A1 * | 4/2022 | Kim | B60H 1/00007 |

FOREIGN PATENT DOCUMENTS

| | | | | |
|---|---|---|---|---|
| DE | 102019114581 A1 * | 2/2020 | ......... | B60H 1/00278 |
| DE | 102020131453 A1 * | 12/2021 | ......... | B60H 1/00007 |
| EP | 3623183 B1 * | 12/2020 | ......... | B60H 1/00007 |
| JP | 5336033 B2 | 11/2013 | | |
| KR | 20150098984 A * | 8/2015 | | |

* cited by examiner

THERMAL MANAGEMENT SYSTEM FOR VEHICLE

CROSS-REFERENCE TO RELATED APPLICATION

This application claims priority to and the benefit of Korean Patent Application No. 10-2020-0130997, filed on Oct. 12, 2020, the entire contents of which are incorporated herein by reference.

FIELD

The present disclosure relates to a thermal management system for a vehicle.

BACKGROUND

The statements in this section merely provide background information related to the present disclosure and may not constitute prior art.

In general, an air conditioner for a vehicle includes an air conditioning system for circulating a coolant in order to heat or cool an inside of the vehicle.

Such an air conditioner maintains a comfortable indoor environment by maintaining an interior temperature of the vehicle at an appropriate level regardless of an external temperature change. The interior of the vehicle is warmed or cooled through heat exchange by a condenser and an evaporator during a process in which a refrigerant discharged by a compressor circulates back to the compressor after passing through a condenser, a receiver dryer, an expansion valve, and an evaporator.

That is, the air conditioner system condenses a gaseous coolant of a high temperature and a high pressure compressed by the compressor in a cooling mode in the summer to reduce a temperature and humidity of the interior of the vehicle through evaporation in the evaporator through the receiver dryer and the expansion valve.

Meanwhile, in recent years, as interest in energy efficiency and environmental pollution has been increasing, there has been a demand for the development of environmentally friendly vehicles configured for substantially replacing internal combustion engine vehicles. The environmentally friendly vehicles are usually fuel cell or electric vehicles driven by electricity or a hybrid vehicle driven by an engine and a battery.

That is, an electric vehicle has become popular as a future transporting means, as environment and energy resources are becoming important issues. The electric vehicle uses a battery module in which a plurality of rechargeable cells is formed as one pack as a main power source, and thus no exhaust gas is generated and noise is very low.

Such an electric vehicle is driven by a drive motor which operates through electric power supplied from the battery module. In addition, the electric vehicle includes electrical components for controlling and managing the drive motor as well as a plurality of electronic convenience devices and charging the battery module.

On the other hand, since a large amount of heat is generated in the battery and the electrical components as well as the drive motor used as a primary power source of the electric vehicle, efficient cooling is desired, so efficient temperature management of the electrical components and the battery module may be very important.

Conventionally, separate cooling systems are applied to adjust the temperature of the electrical components and the battery module, but it is desirable to increase capacity of the cooling system according thereto, which leads to space restrictions. Further, when the capacity of the cooling systems is increased, power required for operating the cooling systems is also increased.

Accordingly, we have discovered that it is desirable to develop technologies for efficiently using the waste heat generated from the electrical components, as well as adjusting the temperature of the electrical components and the battery in order to improve the energy efficiency while providing the durability of the electrical components and the battery module in the electric vehicle.

The above information disclosed in this Background section is only for enhancement of understanding of the background of the disclosure and therefore it may contain information that does not form the prior art that is already known to a person of ordinary skill in the art.

SUMMARY

The present disclosure provides a thermal management system for a vehicle, which adjusts a temperature of a battery module by using one chiller that performs heat exchange between a refrigerant and a coolant and improves heating efficiency by using waste heat generated from an electrical component.

One form of the present disclosure provides a thermal management system for a vehicle, including: a cooling apparatus that includes a first radiator and a first water pump connected to each other by a coolant line and that circulates a coolant through the coolant line to cool an oil cooler that cools at least one motor and at least one electrical component; a battery cooling apparatus that includes a second radiator, a second water pump and a battery module connected to each other by a battery coolant line and that circulates the coolant to the battery module; a chiller provided in the battery coolant line to allow the coolant to pass through an interior, connected to refrigerant line of an air conditioner through refrigerant connection line, and configured to adjust the coolant temperature by heat-exchanging a selectively received coolant with refrigerant supplied from the air conditioner; and a heater provided in the coolant line between the electrical component and the first radiator to heat a vehicle interior by using a coolant supplied from the cooling apparatus, wherein a condenser included in the air conditioner is connected to the coolant line so as to pass the coolant circulating through the cooling apparatus, and wherein a first branch line connected to the coolant line between the oil cooler and the first radiator through a first valve is provided in the coolant line between the first radiator and the first water pump.

The air conditioner may include: an HVAC module including an opening and closing door that is connected to the refrigerant line and that adjusts an ambient air having passed through an evaporator to selectively introduce the ambient air into the heater depending on cooling, heating, and dehumidification modes of a vehicle; a condenser provided in the coolant line between the first radiator and the heater to circulate a coolant therein and to perform heat exchange between the coolant and a refrigerant supplied through the refrigerant line; a compressor connected between the evaporator and the condenser through the refrigerant line; a sub-condenser provided in the refrigerant line between the condenser and the evaporator; a first expansion valve provided in the refrigerant line between the sub-condenser and the evaporator; and a second expansion valve provided in the refrigerant connection line.

The second expansion valve may expand the refrigerant introduced through the refrigerant connection line to flow to the chiller when cooling the battery module by the refrigerant.

A first end of the refrigerant connection line may be connected to the refrigerant line between the sub-condenser and the first expansion valve, and a second end of the refrigerant connection line may be connected to the refrigerant line between the evaporator and the compressor.

Each of the chiller and the condenser may be a water-cooled heat exchanger, and the sub-condenser may be an air-cooled heat exchanger.

An air heater provided at an opposite side of the evaporator, with the heater interposed between the air heater and the evaporator to selectively heat outside air passing through the heater, may be further included.

The air heater may be operated to raise a temperature of the outside air passing through the heater when a temperature of a coolant supplied to the heater is lower than a target temperature for interior heating.

A second branch line connecting the chiller and the battery module through the second valve may be provided in the battery coolant line.

When the battery module is cooled in the cooling mode of the vehicle or when the battery module is heated, the second valve may close the battery coolant line connected to the second radiator, and open the second branch line so that the coolant that has passed through the battery module does not pass through the second radiator.

When cooling the electrical component and the battery module by using the coolant, the first branch line may be closed through an operation of the first valve; the second branch line may be closed through an operation of the second valve; the air conditioner may be deactivated; the coolant cooled in the first radiator may be supplied to the electrical component and the oil cooler along the coolant line through an operation of the first water pump; and the coolant cooled in the second radiator may be supplied to the battery module along the battery coolant line through an operation of the second water pump.

When the battery module is cooled in the cooling mode of the vehicle, in the cooling apparatus, the coolant may be circulated in the coolant line by the operation of the first water pump; the first branch line may be closed through an operation of the first valve; the second branch line may be opened through an operation of the second valve; in the battery cooling apparatus, the coolant passing through the chiller may be supplied to the battery module along the second branch line and the opened portion of the battery coolant line through an operation of the second water pump without passing through the second radiator; in the air conditioner, the refrigerant line connecting the sub-condenser and the evaporator may be opened through the operation of the first expansion valve; the refrigerant connection line may be opened through the operation of the second expansion valve; and the first and second expansion valves may expand a refrigerant supplied to the refrigerant line and the refrigerant connection line, respectively, and may supply the expanded refrigerant to the evaporator and the chiller, respectively.

The cooling apparatus may supply the coolant to the condenser through the operation of the first water pump, and the condenser may condense the refrigerant through heat exchange with the coolant, and the sub-condenser may additionally condense the refrigerant introduced from the condenser through heat exchange with the outside air.

When performing a dehumidification mode of the vehicle, the first branch line may be opened through an operation of the first valve; the second branch line may be closed through an operation of the second valve; in the cooling apparatus, the coolant line connected to the first radiator may be closed through an operation of the first valve; the coolant having the temperature that has risen while passing through the electrical component and the oil cooler through an operation of the first water pump may be supplied to the heater along the opened first branch line and the opened coolant line without passing through the first radiator; the coolant discharged from the heater may be again introduced into the electrical component and the oil cooler along the opened coolant line and the first branch line; the battery cooling apparatus may be deactivated; in the air conditioner, the refrigerant may be circulated in the opened refrigerant line through the operation of the first expansion valve; the first expansion valve may expand the refrigerant so that the expanded refrigerant is supplied to the evaporator; and the second expansion valve may close the refrigerant connection line.

When the battery module is heated, the cooling apparatus may be deactivated; the second branch line may be opened through an operation of the second valve; and in the battery cooling apparatus, the coolant passing through the chiller may be circulated to the battery module along the second branch line and an opened portion of the battery coolant line through an operation of the second water pump without passing through the second radiator.

When using the waste heat of the electrical component in the heating mode of the vehicle, the first branch line may be opened through an operation of the first valve; in the cooling apparatus, the coolant line connected to the first radiator may be closed through the operation of the first valve; the coolant having the temperature that has risen while passing through the electrical component and the oil cooler by the operation of the first water pump may be supplied to the heater along the opened first branch line and the opened coolant line without passing through the radiator; and the coolant discharged from the heater may be supplied to the electrical component and the oil cooler along the opened coolant line and the first branch line.

The battery cooling apparatus may further include a first coolant heater provided in the battery coolant line between the battery module and the chiller.

When the battery module is heated, the first coolant heater may be operated to heat a coolant supplied to the battery module along the battery coolant line.

The motor may be connected to the oil cooler through an oil line, and an oil pump may be provided on the oil line.

The oil pump may operate when cooling the motor or recovering waste heat generated from the motor.

The electrical component may include an electric power control unit (EPCU), an inverter, an on board charger (OBC), a power converter, or an autonomous driving controller.

A first reservoir tank may be provided in the coolant line between the first radiator and the first water pump, and a second reservoir tank may be provided in the battery coolant line between the second radiator and the battery module.

A second coolant heater may be provided in the coolant line between the heater and the condenser.

The second coolant heater may be operated to heat the coolant supplied to the heater along the coolant line when the temperature of the coolant supplied to the heater is lower than the target temperature.

As described above, according to the thermal management system for the vehicle according to one form of the present disclosure, the temperature of the battery module may be adjusted depending on the mode of the vehicle by using one chiller for performing heat exchange between the coolant and the refrigerant, and the interior of the vehicle may be heated by using the coolant, thereby simplifying the entire system.

According to the present disclosure, it is also possible to improve the heating efficiency by recovering waste heat from the electrical component and using it for interior heating.

In addition, according to the present disclosure, it is possible to improve the performance of the battery module by efficiently controlling the temperature of the battery module, and increase an overall travel distance of the vehicle through efficient management of the battery module.

Further, according to one form of the present disclosure may improve the cooling performance and reducing power consumption of a compressor by increasing condensation performance of the refrigerant using a condenser and a sub-condenser.

Furthermore, according to one form of the present disclosure, manufacturing cost can be reduced and a weight can be reduced through simplification of an entire system, and spatial utilization can be enhanced.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
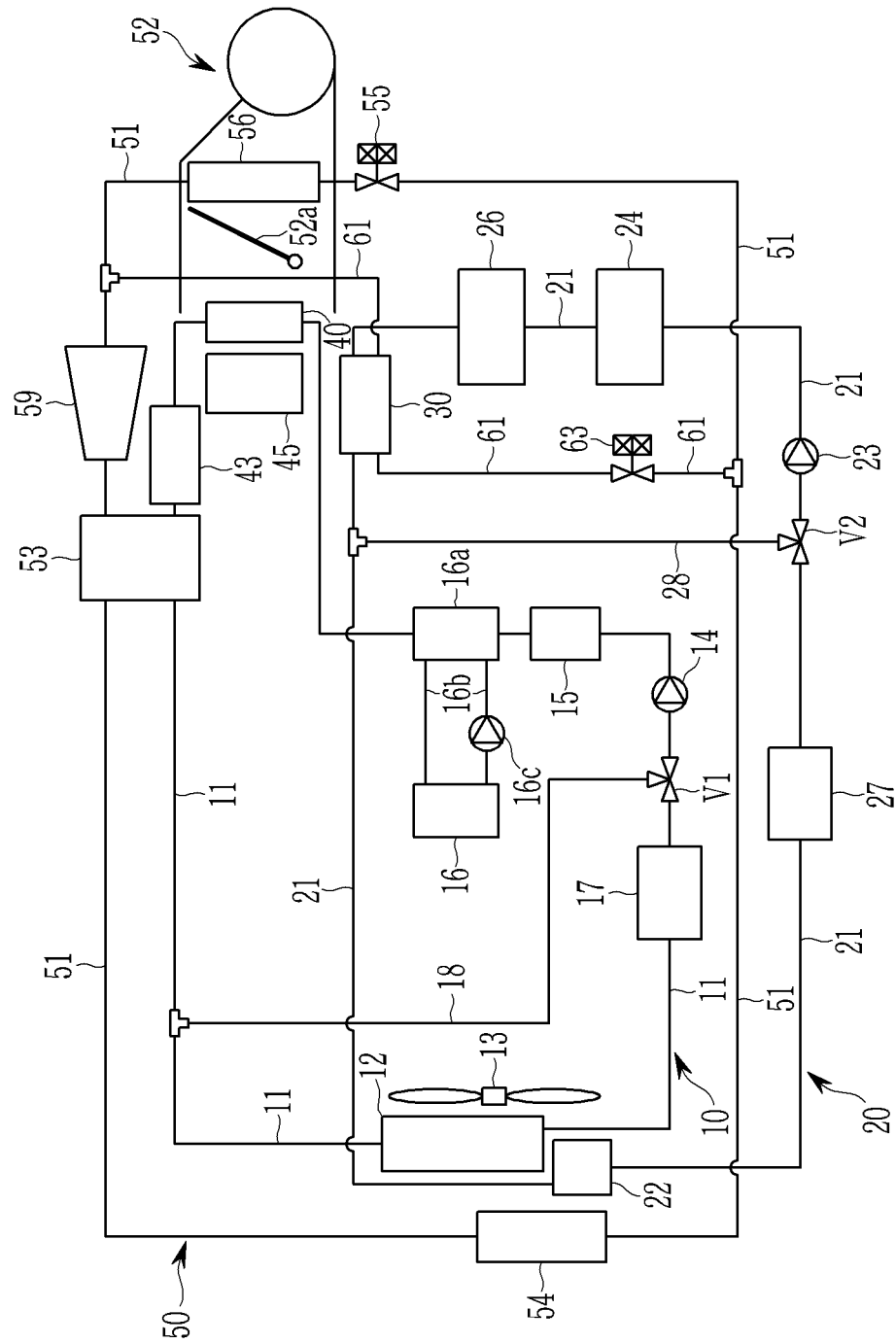
FIG. 1 illustrates a block diagram of a thermal management system for a vehicle according to one form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Various forms described in the present specification and configurations shown in the drawings are just the most preferable exemplary forms of the present disclosure, but do not limit the spirit and scope of the present disclosure. Therefore, it should be understood that there may be various equivalents and modifications capable of replacing them at the time of filing of the present application.

In order to clarify the present disclosure, parts that are not connected with the description will be omitted, and the same elements or equivalents are referred to by the same reference numerals throughout the specification.

The size and thickness of each element are arbitrarily shown in the drawings, but the present disclosure is not necessarily limited thereto, and in the drawings, the thickness of layers, films, panels, regions, etc., are exaggerated for clarity.

Throughout this specification and the claims which follow, unless explicitly described to the contrary, the word "comprise" or variations such as "comprises" or "comprising" will be understood to imply the inclusion of stated elements but not the exclusion of any other elements.

Further, the terms, " . . . unit", " . . . mechanism", " . . . portion", " . . . member", etc. used herein mean a unit of inclusive components performing at least one or more functions or operations.

FIG. 1 illustrates a block diagram of a thermal management system for a vehicle according to one form of the present disclosure.

According to one form of the present disclosure, the thermal management system for a vehicle may adjust a temperature of a battery module 24 by using one chiller 30 in which a refrigerant and a coolant are heat exchanged, and may recover waste heat generated from an electrical component 15 and a motor 16 to use it for interior heating.

Such a thermal management system may be applied to electric vehicles.

Referring to FIG. 1, the thermal management system may include a cooling apparatus 10, a battery cooling apparatus 20, the chiller 30, a heater 40, and an air conditioner 50.

First, the cooling apparatus 10 includes a first radiator 12 and a first water pump 14 connected to a coolant line 11.

The first radiator 12 is disposed in the front of the vehicle, and a cooling fan 13 is disposed behind the first radiator 12, so that the coolant is cooled through an operation of the cooling fan 13 and heat exchange with the outside air.

In addition, the electrical component 15 may include an electric power control unit (EPCU), an inverter, an on board charger (OBC), a power converter, or an autonomous driving controller.

The electric power control unit or the inverter may generate heat while being driven and the on-board charger may generate heat in the case of charging a battery module 24.

The electrical component 15 configured as described above may be provided in the coolant line 11 to be cooled in a water-cooled manner.

Accordingly, when the waste heat of the electrical component 15 is recovered in the heating mode of the vehicle, the heat generated from the EPCU, the inverter, the autonomous driving controller, the OBC, the power converter, or the autonomous driving controller may be recovered.

The cooling apparatus 10 circulates the coolant to the coolant line 11 through the operation of the first water pump 14 to cool an oil cooler 16a cooling the electrical component 15 and the motor 16.

Herein, the motor 16 is connected to the oil cooler 16a provided in the coolant line 11 through an oil line 16b, and an oil pump 16c may be provided on the oil line 16b.

That is, the oil cooler 16a may use the coolant, which is supplied from the first radiator 12, to cool oil to be supplied to the motor 16.

The oil pump 16c may be selectively operated so that the cooled oil is supplied to the motor 16 when cooling of the motor 16 is desired.

In addition, the oil pump 16c may be operated even when the waste heat generated from the motor 16 is recovered in the heating mode of the vehicle.

That is, the oil cooled in the oil cooler 16a increases in a temperature while cooling the motor 16 through the oil line 16b. The oil with the increased temperature may increase a temperature of the coolant while being cooled by heat exchanging with the coolant in the oil cooler 16a.

The waste heat generated from the motor 16 may be recovered through the aforementioned operation.

Meanwhile, the first reservoir tank 17 is provided on the coolant line 11 between the first radiator 12 and the first water pump 14. The coolant cooled in the first radiator 12 may be stored in the first reservoir tank 17.

The cooling apparatus 10 configured as described above circulate the coolant in the coolant line 11 such that the coolant is supplied to the oil cooler 16a for cooling the electrical component 15 and the motor 16.

That is, the cooling apparatus 10 circulates the coolant cooled at the first radiator 12 through the coolant line 11 by the operation of the first water pump 14, thereby cooling the electrical component 15 and the motor 16 so as not to overheat.

Meanwhile, in one form of the present disclosure, the motor 16 is described as one form, but the present disclosure is not limited thereto, and the motor 16 may be configured as two respectively corresponding to front and rear wheels.

When the motor 16 is composed of two, it may be arranged in parallel through a separate parallel line in the coolant line 11.

In one form of the present disclosure, the battery cooling apparatus 20 includes a second radiator 22, second water pump, 23 and battery module 24 connected to a battery coolant line 21.

The battery cooling apparatus 20 may selectively supply the coolant cooled in the second radiator 22 to the battery module 24.

Herein, the second radiator 22 is disposed on the same line as the first radiator 12, and cools the coolant through an operation of the cooling fan 13 and heat exchange with the outside air.

in addition, second reservoir tank 27 is provided on the battery coolant line 21 between the second radiator 22 and the second water pump 23. The coolant cooled in the second radiator 22 may be stored in the second reservoir tank 27.

The battery cooling apparatus 20 configured as described above, may selectively circulate the coolant to the battery module 24 through an operation of the second water pump 23.

Herein, the battery module 24 supplies power to the electrical component 15 and the motor 16, and is provided as a water cooling type so that the battery module 24 is cooled by the coolant that flows along the battery coolant line 21.

In addition, the first and second water pumps 14 and 23 may be electric water pumps.

Meanwhile, the battery cooling apparatus 20 may further include a first coolant heater 26 provided in the battery coolant line 21 between the battery module 24 and the second radiator 22.

When it is desired to increase the temperature of the battery module 24, the first coolant heater 26 is turned on to heat the coolant circulated in the battery coolant line 21 such that the coolant of which temperature is increased may be supplied to the battery module 24.

The first coolant heater 26 may be an electric heater that operates according to supply of electric power.

That is, the first coolant heater 26 is operated when the temperature of the coolant supplied to the battery module 24 is lower than the target temperature, so that the coolant circulating in the battery coolant line 21 may be heated.

Accordingly, the coolant having an increased temperature while passing through the first coolant heater 26 may be supplied to the battery module 24, to raise the temperature of the battery module 24.

That is, the first coolant heater 26 may selectively operate when the temperature of the battery module 24 is raised.

In one form of the disclosure, the chiller 30 is provided on the battery coolant line 21 between the second radiator 22 and the battery module 24, and the coolant passes therethrough.

The chiller 30 is connected to a refrigerant line 51 of an air conditioner 50 through a refrigerant connection line 61. That is the chiller 30 may be a water-cooled heat exchanger into which a coolant flows.

As a result, the chiller 30 may regulate the temperature of the coolant by performing heat exchange between the coolant that is selectively supplied to the battery coolant line 21, and the refrigerant that is selectively supplied from the air conditioner 50.

The heater 40 is provided in the coolant line 11 between the electrical component 15 and the radiator 12 to heat a vehicle interior by using the coolant.

Accordingly, when heating an interior of the vehicle, the high-temperature coolant that has passed through the electrical component 15 and the oil cooler 16a may be supplied to the heater 40.

That is, the high temperature coolant passing through the electrical component 15 and the oil cooler 16a is supplied to the heater 40 through the operation of the first water pump 14 in the heating mode of the vehicle, thereby heating the vehicle interior.

The heater 40 may be provided inside a heating, ventilation, and air conditioning (HVAC) module 52 included in the air conditioner 50.

Herein, a second coolant heater 43 to selectively heat the coolant circulating in the coolant line 11 may be provided in the coolant line 11 between the electrical component 15 and the heater 40.

The second coolant heater 43 is ON-operated when the temperature of the coolant supplied to the heater 40 in the heating mode of the vehicle is lower than a target temperature to heat the coolant circulated in the coolant line 11, thereby inflowing the coolant of which the temperature is increased to the heater 40.

The second coolant heater 43 may be an electric heater that operates according to the power supply.

On the other hand, in one form of the present disclosure, it is described that the second coolant heater 43 is provided in the coolant line 11, however it is not limited thereto, and an air heater 45 to increase the temperature of the outside air inflowing to the interior of the vehicle may be applied instead of the second coolant heater 43.

The air heater 45 may be disposed on the rear of the heater 40 toward the interior of the vehicle inside the HVAC module (not shown) to selectively heat the outside air passing through the heater 40.

That is, any one of the second coolant heater 43 and the air heater 45 may be applied to the heater 40.

The heater 40 configured as described above is supplied with the coolant whose temperature has increased while passing through the electrical component 15 in the heating mode of the vehicle through the operation of the first water pump 14, thereby heating the vehicle interior.

Meanwhile, a first branch line 18 connected to the coolant line 11 through the first valve V1 provided on the coolant line 11 between the first radiator 12 and the first water pump 14 may be provided in the cooling apparatus 10.

A first end of the first branch line 18 may be connected to the coolant line 11 through the first valve V1. A second end of the first branch line 18 may be connected to the coolant line between the first radiator 12 and the oil cooler 16a.

When recovering the waste heat of the electrical component 15 and the waste heat of the motor 16 through the oil cooler 16a, the first branch line 18 may selectively opened through the operation of the first valve V1 such that the coolant which has passed through the electric component 15 and the oil cooler 16a is supplied again to the electric component 15 and the oil cooler 16a without passing through the first radiator 12.

In one form of the present disclosure, the first valve V1 may close the coolant line 11 connected to the first radiator 12 and open the first branch line 18 in the heating mode of the vehicle such that the coolant that has passed through the electrical component 15 and the oil cooler 16a does not pass through the first radiator.

In addition, a second branch line 28 connected to the battery coolant line 21 through the second valve V2 provided on the battery coolant line 21 between the second radiator 22 and the battery module 24 may be provided in the battery cooling apparatus 20.

A first end of the second branch line 28 is connected to the battery coolant line 21 through the second valve V2. A second end of the second branch line 28 may be connected to the battery coolant line 21 between the chiller 30 and the second radiator 22.

When cooling the battery module 24 in the cooling mode of the vehicle, or when increasing the temperature of the battery module 24, the second branch line 28 may be selectively opened or closed through the operation of the second valve V2 so that the coolant that has passed through the battery module 24 is supplied again to the battery module 24 without passing through the second radiator 22.

That is, when cooling the battery module 24 in the cooling mode of the vehicle, or when increasing the temperature of the battery module 24, the second valve V2 may close the battery coolant line 21 connected to the second radiator 22 and open the second branch line 28 so that the coolant that has passed through the battery module 24 does not pass through the second radiator 22.

The first valve V1 and the second valve V2 may control the flow stream of the coolant in the cooling apparatus 10 and the battery cooling apparatus 20 through the opening and closing control of the first and second branch lines 18 and 28.

In other words, when cooling the electrical component 15 and the oil cooler 16a using the coolant cooled in the first radiator 12, the first valve V1 may open the coolant line 11 connected to the first radiator 12 and close the first branch line 18.

The coolant cooled in the first radiator 12 may cool electrical component 15 and the oil cooler 16a while circulating along the coolant line 11 connected through the operation of the first valve V1.

On the contrary, when the waste heat of the electrical component 15 and the oil cooler 16a are recovered, the first valve V1 may close the coolant line 11 connected to the first radiator 11 and open the first branch line 18.

Then, the coolant circulated in the cooling apparatus 10 may have an increased temperature while passing through the electrical component 15 and the oil cooler 16a along the opened the coolant line 11 and the opened first branch line 18 without passing through the first radiator 12.

When the battery module 24 is to be cooled by using the coolant having exchanged heat with the refrigerant in the chiller 30, the second valve V2 may open the second branch line 28, and close the battery coolant line 21 connected to the second radiator 22.

Accordingly, the coolant of a low temperature having heat-exchanged with the refrigerant at the chiller 30 may introduced into the battery module 24 through the second branch line 28 opened by the second valve V2, thereby efficiently cooling the battery module 24.

On the other hand, when the temperature of the battery module 24 is to be increased, the coolant circulating through the battery coolant line 21 by the operation of the second valve V2 is inhibited from flowing to the second radiator 22, and the coolant heated by the operation of the first coolant heater 26 flows to the battery module 24, thereby rapidly increasing the temperature of the battery module 24.

Meanwhile, in one form of the present disclosure, the air conditioner 50 includes a heating, ventilation, and air conditioning (HVAC) module 52, a condenser 53, a sub-condenser 54, a first expansion valve 55, an evaporator 56, and a compressor 59, which are connected to each other through the refrigerant line 51.

First, the HVAC module 52 includes the evaporator 56 connected therewith through the refrigerant line 51, and an opening and closing door 52a for controlling the outside air passing through the evaporator 56 to be selectively introduced into the heater 40 depending on cooling mode, heating mode, and heating and dehumidification modes of the vehicle therein.

That is, the opening and closing door 52a is opened in the heating mode of a vehicle such that the outside air having passed through the evaporator 56 may flow to the heater 40.

To the contrary, in the cooling mode of a vehicle, the opening and closing door 52a closes the heater 40 such that the outside air cooled while passing through the evaporator 56 may directly flow into the vehicle.

Herein, when the second coolant heater 43 is not provided in the coolant line 11, the air heater 45 provided in the HVAC module 52 may be provided at an opposite side of the evaporator 56 with the heater 40 interposed therebetween.

The air heater 45 may be operated to raise the temperature of the outside air flowing into the heater 40 when the temperature of the coolant supplied to the heater 40 is lower than a target temperature for interior heating.

On the other hand, the air heater 45 may be provided inside the HVAC module 52 when the second coolant heater 43 is not provided in the coolant line 11.

That is, in the thermal management system according to the present disclosure, only one of the second coolant heater 43 and the air heater 45 may be applied.

In one form of the present disclosure, the condenser 53 is connected with the refrigerant line 51 to allow the refrigerant to pass therethrough. The condenser 53 is provided on the coolant line 11 between the heater 40 and the radiator 12 such that the coolant circulating the coolant line 11 passes through.

This condenser 53 may condense the refrigerant through heat exchange with the coolant circulating the coolant line 11. That is, the condenser 53 may be a water-cooled heat exchanger into which the coolant flows.

The condenser 53 configured as described above may perform heat exchange between the refrigerant supplied from the compressor 59 and the coolant supplied from the cooling apparatus 10 so as to condense the refrigerant.

In one form of the present disclosure, the sub-condenser 54 may be provided in the refrigerant line 51 between the condenser 53 and the evaporator 56.

Herein, the sub-condenser 54 may further condense the refrigerant condensed in the condenser 53 through heat exchange with the outside air. In other words, the sub-condenser 54 is disposed in front of the first radiator 12 to mutually heat exchange the coolant that has been inflowed therein with the outside air.

As a result, the sub-condenser 54 may be an air-cooled heat exchanger for condensing the refrigerant by using outside air.

As such, the sub-condenser 54 may further condense the refrigerant that is condensed in the condenser 53 to increase sub cooling of the coolant, thereby improving a coefficient of performance (COP), which is a coefficient of the cooling capacity relative to the power required by the compressor.

The first expansion valve 55 is provided in the refrigerant line 51 between the sub-condenser 54 and the evaporator 56. The first expansion valve 55 receives the refrigerant passing through the second condenser 54 to expand it.

In one form of the present disclosure, a first end of the refrigerant connection line 61 is connected to the refrigerant line 51 between the sub-condenser 54 and the first expansion valve 55. A second end of the refrigerant connection line 61 may be connected to the refrigerant line 51 between the evaporator 56 and the compressor 59.

Herein, a second expansion valve 63 is provided in the refrigerant connection line 61. The second expansion valve 63 may expand the refrigerant flowing through the refrigerant connection line 61 to introduce it into the chiller 30 when the battery module 24 is cooled by the coolant heat exchanged with the refrigerant.

In addition, the second expansion valve 63 is operated to expand the refrigerant, when the battery module 24 is cooled by using the refrigerant in the cooling mode of the vehicle.

That is, the second expansion valve 63 may introduce the refrigerant exhausted from the sub-condenser 54 into the chiller 30 in a state where the temperature of the refrigerant is reduced by expanding the refrigerant, to further reduce the temperature of the coolant passing through the interior of the chiller 30.

As a result, the coolant having the temperature that is reduced while passing through the chiller 30 is introduced into the battery module 24, thereby being more efficiently cooled.

The compressor 59 is connected thereto between the evaporator 56 and the condenser 53 through the refrigerant line 51. This compressor 59 may compress the gaseous refrigerant and supply the compressed refrigerant to the condenser 53.

Herein, the first and second expansion valves 55 and 63 may be electronic expansion valves that selectively expand the coolant while controlling a flow of the refrigerant through the coolant line 51 or the refrigerant connection line 61.

In addition, the first and second valves V1 and V2 may be 3-way valves capable of distributing the amount of the coolant.

Hereinafter, an operation and function of the thermal management system for the vehicle according to one form of the present disclosure configured as described above will be described in detail with reference to FIG. 2 to FIG. 6.

First, an operation of a case of cooling the electrical component 15, the oil cooler 16a, and the battery module 24 using the coolant cooled in the first and second radiators 12 and 22 in the thermal management system for the vehicle according to one form of the present disclosure will be described with reference to FIG. 2.

Figure 2:
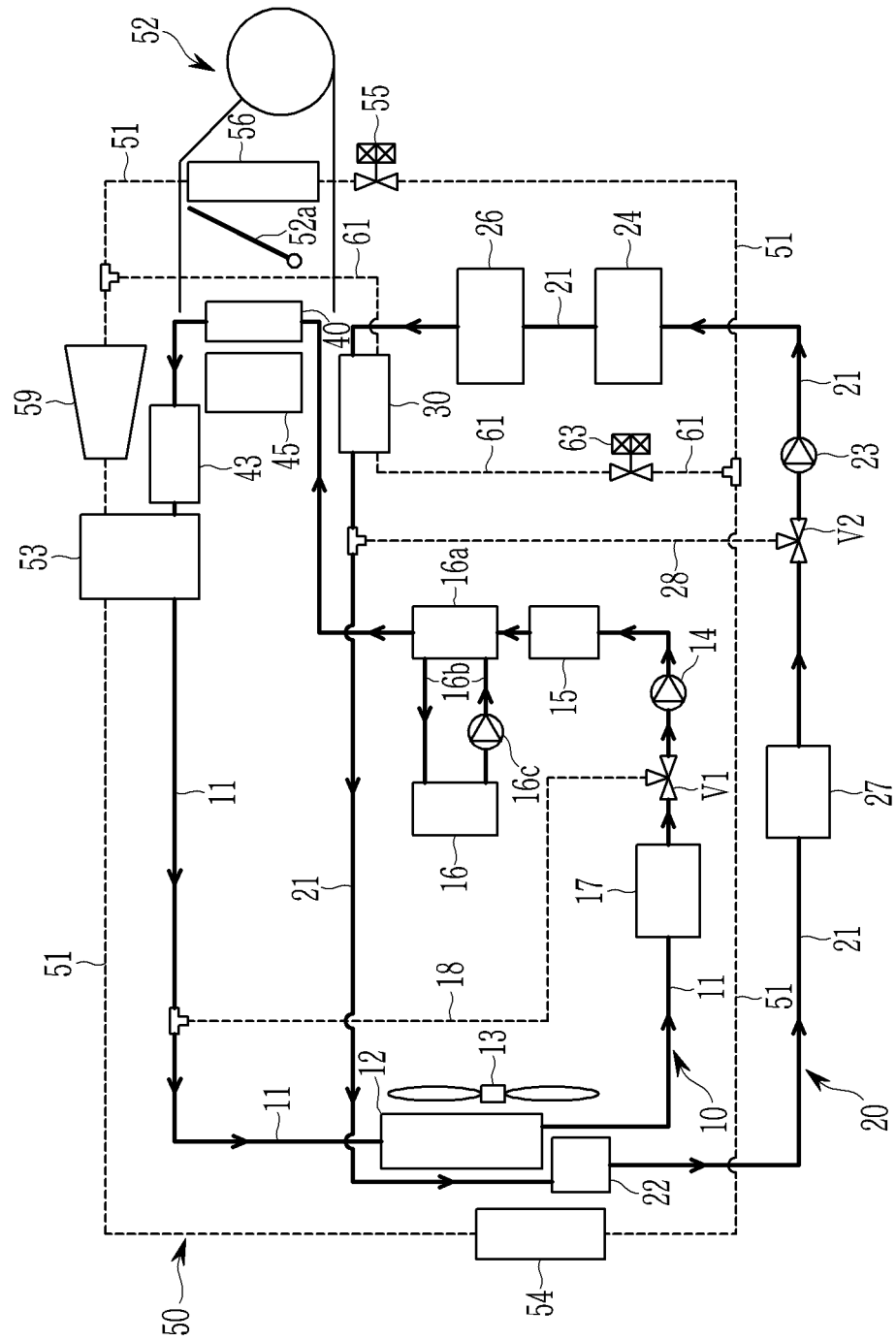
FIG. 2 illustrates an operational state diagram for cooling electrical components and a battery module by using a coolant in a thermal management system for a vehicle according to one form of the present disclosure.

FIG. 2 illustrates an operational state diagram for cooling electrical components and a battery module by using a coolant in a thermal management system for a vehicle according to one form of the present disclosure.

Referring to FIG. 2, the first branch line 18 is closed through the operation of the second valve V2. The second branch line 28 is closed through the operation of the second valve V2.

In this state, in the cooling apparatus 10, the first water pump 14 is operated to cool the electrical component 15 and the oil cooler 16a.

Then, the coolant that is cooled in the first radiator 12 and stored in the first reservoir tank 17 is supplied to the electrical component 15 and the oil cooler 16a, while circulating through the coolant line 11 by the operation of the first water pump 14.

Accordingly, the electrical component 15 and the oil cooler 16a may be efficiently cooled.

Meanwhile, the oil pump 16c operates to supply the motor 16 with the oil cooled in the oil cooler 16a, and the oil line 16b may remain opened by the operation of the oil pump 16c.

Therefore, the motor 16 is cooled by being supplied with the cooled oil from the oil cooler 16a.

In the battery cooling apparatus 20, the second water pump 23 is operated to cool the battery module 24.

Then, the coolant that is cooled in the second radiator 22 and stored in the second reservoir tank 27 is supplied to the battery module 24, while circulating through the battery coolant line 21 by the operation of the second water pump 23.

The coolant having cooled the battery module 24 is introduced into the second radiator 22 after passing through the first coolant heater 26 and the chiller 30 which are turned-off along the battery coolant line 21.

That is, since the low-temperature coolant cooled in the second radiator 22 cools only the battery module 24, the battery module 24 may be efficiently cooled.

As such, each coolant cooled in the first and second radiators 12, 22, and stored in the first and second reservoir tanks 17, 27 is circulated in the coolant line 11 and the battery coolant line 21 through operations of the first and second water pumps 14, 23 to cool the electrical component 15, oil cooler 16a and the battery module 24 respectively. Accordingly, the coolant may efficiently cool the electrical component 15, oil cooler 16a and the battery module 24.

The air conditioner 50 is not operated because the cooling mode of the vehicle is deactivated.

On the other hand, although it has been described in one form of the present disclosure that both of the electrical component 15, the oil cooler 16a and the battery module 24 are cooled by the coolant cooled in the first and second radiators 12, 22, the present disclosure is not limited thereto, and when one of the electrical component 15, the oil cooler 16a and the battery module 24 is separately cooled, the first and second water pumps 14, 23 may be selectively operated.

An operation of the case of cooling the battery module 24 using the refrigerant in the cooling mode of the vehicle will be described with respect to FIG. 3.

Figure 3:
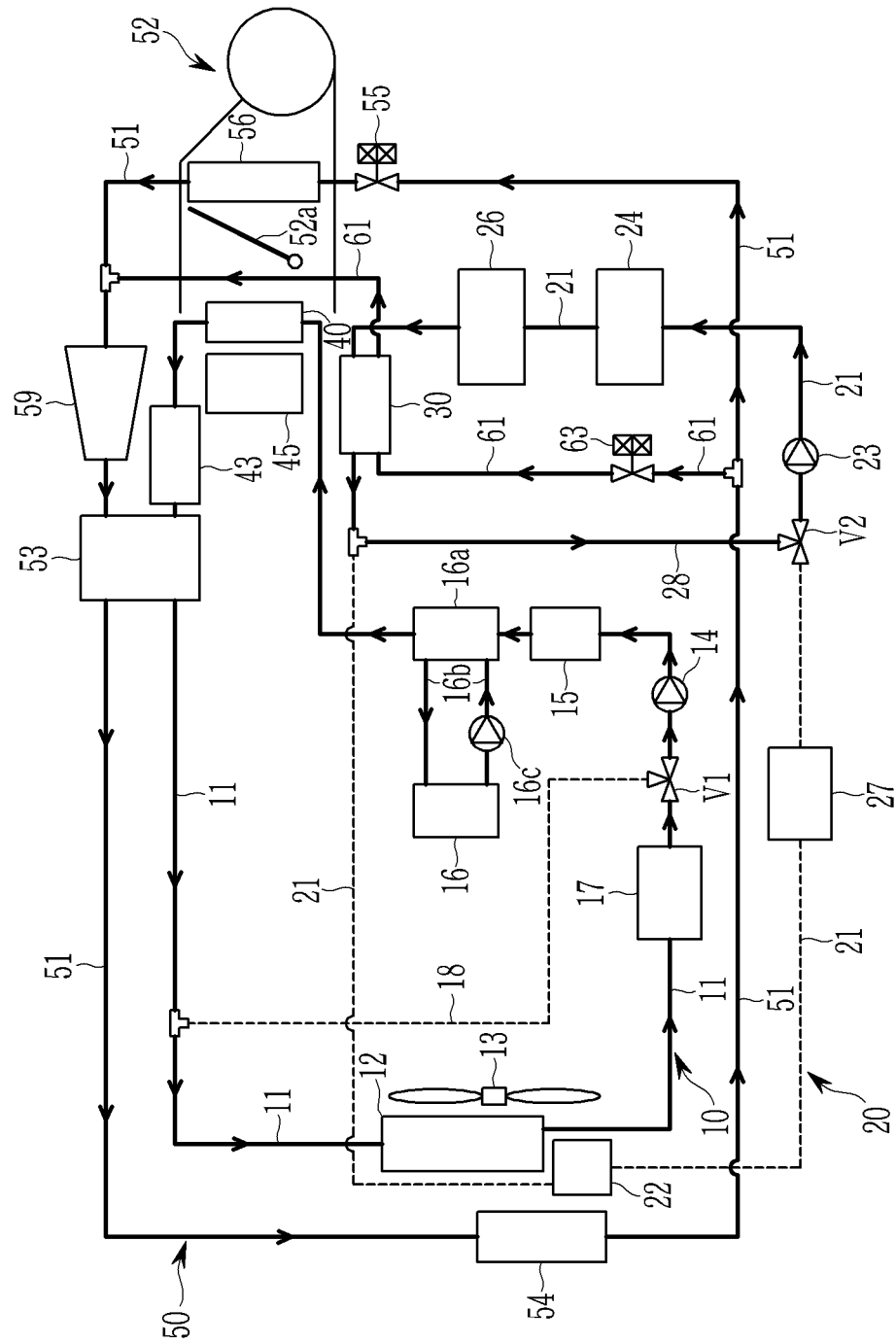
FIG. 3 illustrates an operational state diagram for cooling a battery module by using a refrigerant in a cooling mode of a vehicle in a thermal management system for a vehicle according to one form of the present disclosure.

FIG. 3 illustrates an operational state diagram for cooling a battery module by using a refrigerant in a cooling mode of a vehicle in a thermal management system for a vehicle according to one form of the present disclosure.

Referring to FIG. 3, in the cooling apparatus 10, the coolant is circulated in the coolant line 11 by the operation of the first water pump 14. The first branch line 18 is closed through the operation of the second valve V2.

Accordingly, the coolant that is cooled in the first radiator 12 and stored in the first reservoir tank 17 is supplied to the electrical component 15 and the oil cooler 16a, while circulating through the coolant line 11 by the operation of the first water pump 14.

Meanwhile, the oil pump 16c operates to supply the motor 16 with the oil cooled in the oil cooler 16a, and the oil line 16b may remain opened by the operation of the oil pump 16c.

In the battery cooling apparatus 20, the second water pump 23 is operated to cool the battery module 24. Herein, the second branch line 28 is opened through the operation of the second valve V2.

That is, in the battery cooling apparatus 20, the coolant passing through the chiller 30 is supplied to the battery module 24 along the second branch line 28 and the opened portion of the battery coolant line 21 through the operation of the second water pump 23.

The coolant passing through the battery module 24 is introduced into the chiller 30. The coolant passing through the chiller 30 is circulated along the opened battery coolant line 21 and the opened second branch line 28, and may be supplied into the battery module 24 without passing through the second radiator 22.

Meanwhile, in the cooling apparatus 10, the coolant is circulated in the coolant line 11 by the operation of the first water pump 14.

Accordingly, the coolant cooled in the first radiator 12 may be supplied to the condenser 53 through the operation of the first water pump 14, after passing through the electrical component 15, the oil cooler 16a and the heater 40.

That is, the cooling apparatus 10 may supply the coolant to condenser 53 through the operation of the first water pump 14.

In the air conditioner 50, each constituent element operates to cool the interior of the vehicle. Accordingly, the refrigerant is circulated along the refrigerant line 51.

Herein, the refrigerant line 51 connecting the sub-condenser 54 and the evaporator 56 is opened through the operation of the first expansion valve 55. The refrigerant connection line 61 is opened through the operation of the second expansion valve 63.

Then, the refrigerant having passed through the sub-condenser 54 may be circulated along the refrigerant line 51 and the refrigerant connection line 61.

Herein, the first and second expansion valves 55 and 63 may expand the refrigerant such that the expanded refrigerant is supplied to the evaporator 56 and the chiller 30, respectively.

The condenser 53 condenses the refrigerant by using the coolant flowing along the coolant line 11. Also, the sub-condenser 54 may further condense the refrigerant introduced from the condenser 53 through heat exchange with the outside air.

Meanwhile, the coolant passing through the chiller 30 is circulated in the battery coolant line 21 to cool the battery module 24 through the operation of the second water pump 23.

The coolant passing through the chiller 30 is cooled through heat exchange with the expanded refrigerant that is supplied to the chiller 30. The coolant cooled in the chiller 30 is supplied to the battery module 24 along the second branch line 28 and the opened battery coolant line 21. Accordingly, the battery module 24 is cooled by the cooled coolant.

That is, the second expansion valve 63 expands some of the coolant through the sub-condenser 54 to supply the expanded coolant to the chiller 30, and opens the refrigerant connection line 61.

Accordingly, the refrigerant discharged from the sub-condenser 54 is expanded to enter a low-temperature and low-pressure state through the operation of the second expansion valve 63, and flows into the chiller 30 connected to the refrigerant connection line 61.

Thereafter, the refrigerant flowing into the chiller 30 is performed heat exchange with the coolant, and then is introduced into the compressor 59 through the refrigerant connection line 61.

In other words, the coolant with the increased temperature from cooling the battery module 24 is cooled through heat exchange with the low temperature low pressure refrigerant inside the chiller 30. The cooled coolant is again supplied to the battery module 24 through the opened battery coolant line 21 and the opened second branch line 28.

That is, the coolant may efficiently cool the battery module 24 while repeating the above-described operation.

On the other hand, the remaining refrigerant discharged from the sub-condenser 54 flows through the refrigerant line 51 to cool the interior of the vehicle, and sequentially passes through the first expansion valve 55, the evaporator 56, the compressor 59, and the condenser 53.

Herein, the outside air flowing into the HVAC module 52 is cooled while passing through the evaporator 56 by the low-temperature refrigerant flowing into the evaporator 56.

In this case, a portion of the heater 40 through which the cooled outside air passes is closed by the opening and closing door 52a such that the outside air does not pass through the heater 40. Accordingly, the cooled outside air directly flows into the interior of the vehicle, thereby cooling the vehicle interior.

On the other hand, the coolant having an amount of condensation that is increased while sequentially passing through the condenser 53 and the sub-condenser 54 may be expanded and supplied to the evaporator 56, thereby allowing the refrigerant to be evaporated to a lower temperature.

As a result, in one form of the present disclosure, the condenser 53 condenses the refrigerant, and the sub-condenser 54 further condenses the refrigerant, which is advantageous in forming the sub-cooling of the refrigerant.

In addition, as the sub-cooled refrigerant may be evaporated to a lower temperature in the evaporator 56, the temperature of the outside air passing through the evaporator 56 may be further lowered, thereby improving cooling performance and efficiency.

The refrigerant may cool the interior of the vehicle in the cooling mode of the vehicle while repeating the above-described processes, and at the same time, may cool the coolant through the heat exchange while passing through the chiller 30.

The low-temperature coolant cooled in the chiller 30 is introduced into the battery module 24. Accordingly, the battery module 24 may be efficiently cooled by the low-temperature coolant supplied therefrom.

In one form of the present disclosure, an operation of the case of using the waste heat of the electrical component 15 and the oil cooler 16a without operating the air conditioner 50 in the heating mode of the vehicle will be described with reference to FIG. 4.

Figure 4:
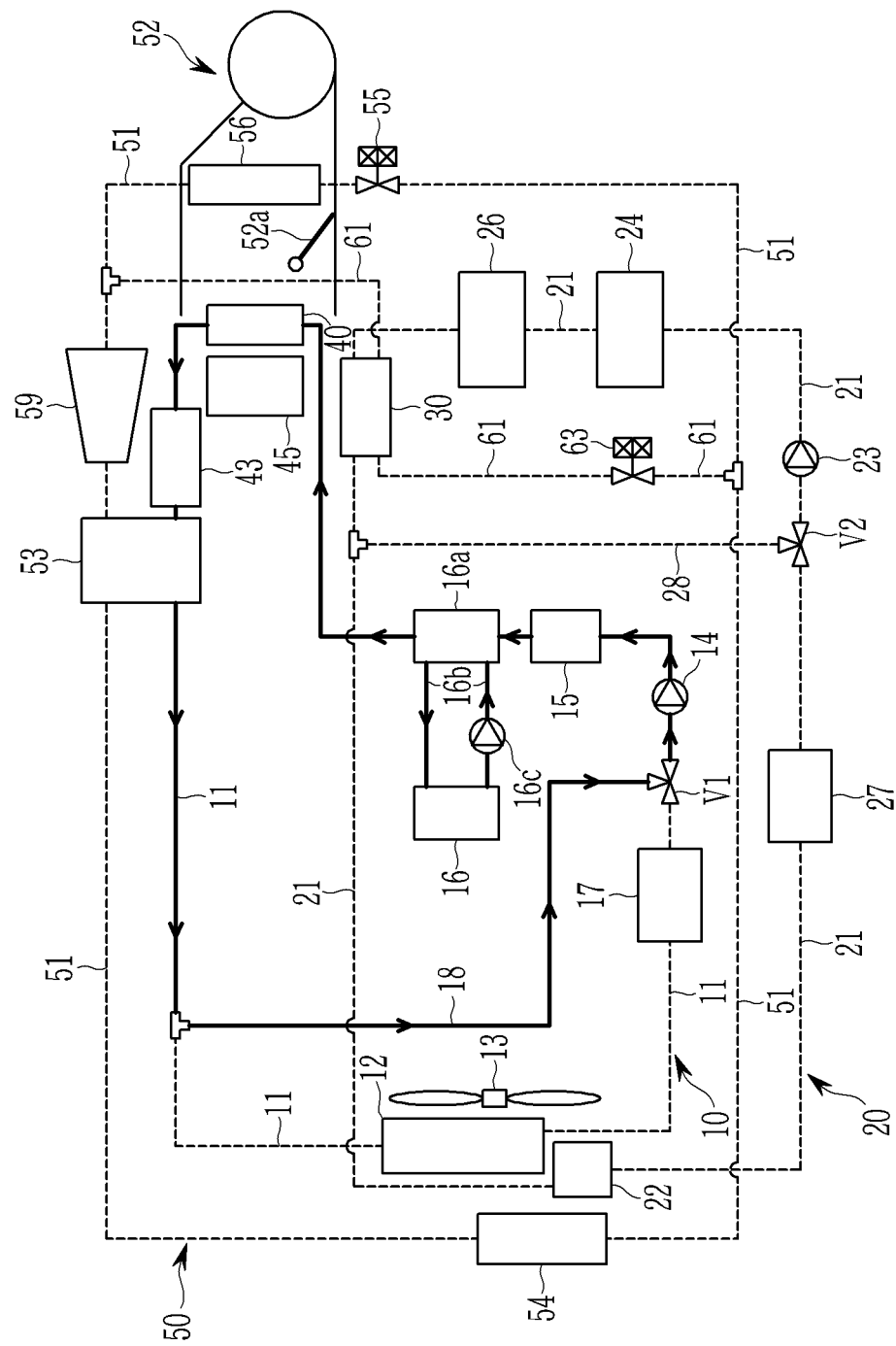
FIG. 4 illustrates an operational state diagram for performing the heating mode using waste heat of an electrical component in a thermal management system for a vehicle according to one form of the present disclosure.

FIG. 4 illustrates an operational state diagram for performing the heating mode using waste heat of an electrical component in a thermal management system for a vehicle according to one form of the present disclosure.

Referring to FIG. 4, the thermal management system may perform heating the interior of the vehicle by using waste heat from the electrical component 15 and the oil cooler 16a without operating the air conditioner 50.

First, in the cooling apparatus 10, the first water pump 14 is operated for circulation of the coolant. In this case, the air conditioner 50 is deactivated.

Herein, in the cooling apparatus 10, the coolant line 11 connected to the first radiator 12 is closed through the operation of the first valve V1. The first branch line 18 is opened through the operation of the first valve V1.

Accordingly, on the basis of the first branch line 18, a portion of the coolant line 11 connected to the first radiator 12 and a portion of the coolant line 11 connecting the first radiator 12 and the first reservoir tank 17 are closed through the operation of the first valve V1.

In this state, the coolant passing through the electrical component 15 and the oil cooler 16a may circulate along the opened first branch line 18 and an opened portion of the coolant line 11 without passaging through the first radiator 12 through the operation of the first water pump 14.

Herein, the oil pump 16c operates to supply the motor 16 with the oil cooled in the oil cooler 16a, and the oil line 16b may remain opened by the operation of the oil pump 16c.

Meanwhile, in the battery cooling apparatus 20, the second water pump 23 is deactivated.

That is, the battery coolant line 21 connecting the second water pump 23 and the battery module 24 is closed, and the operation of the battery cooling apparatus 20 is deactivated.

Thus, the coolant passing through the electrical component 15 and the oil cooler 16a continuously circulates along the opened coolant line 11 and the opened first branch line 18 without passing through the first radiator 12, and absorbs the waste heat from the electrical component 15 and the oil cooler 16a such that the temperature is increased.

While repeatedly performing such an operation, the coolant absorbs the waste heat from the electric component 15 and the oil cooler 16a and may increase the temperature.

The coolant having the temperature that has risen while passing through the electrical component 15 by the operation of the first water pump 14 is supplied to the heater 40 along the opened coolant line 11 without passing through the first radiator 12.

The coolant discharged from the heater 40 is introduced into the electric component 15 and the oil cooler 16a along the opened coolant line 11 and the first branch line 18.

That is, the coolant that has passed through the electrical component 15 and the oil cooler 16a continues to circulate along the opened coolant line 11 and the opened first branch line 18 without passing through the first radiator 12, and absorbs the waste heat from the electric component 15 and the oil cooler 16a, such that the temperature thereof increases.

The coolant having the temperature that has been raised is introduced into the heater 40 along the coolant line 11 without passing through the first radiator 12.

Herein, the second coolant heater 43 is operated when the temperature of the coolant circulating along the coolant line 11 is lower than the target temperature, so that the coolant circulating in the coolant line 11 may be heated.

On the other hand, when the air heater 45 is applied instead of the second coolant heater 43, the air heater 45 may be selectively operated depending on the temperature of the outside air passing through the heater 40.

That is, the air heater 45 may be operated when the temperature of the outside air passing through the heater 40 is lower than a target temperature, thereby heating the outside air flowing into the interior of the vehicle.

The air heater 45 is operated when the temperature of the outside air that has completed heat exchange with the high-temperature coolant while passing through the heater 40 is lower than a set temperature or a target heating temperature.

When the air heater 45 is operated, the outside air may be heated while passing through the air heater 45, to be introduced into the vehicle interior in a state where the temperature is raised.

Meanwhile, the high-temperature coolant supplied to the heater 40 performs heat exchange with the outside air, and then is introduced into the coolant line 11.

Thereafter, the coolant is introduced into the coolant line 11 connected to the electrical component 15 and the oil cooler 16a along the opened first branch line 18 without passing through the first radiator 12.

Meanwhile, the opening and closing door 52a is opened such that the outside air flowing into the HVAC module 52 passes through the heater 40.

As a result, the outside air inflow from the outside flows into the interior in an uncooled temperature state when passing through the evaporator 56, which is not supplied with the refrigerant. The introduced outside air is converted to a high temperature state while passing through the heater 40 to be introduced into the interior of the vehicle, thereby providing the heating of the interior of the vehicle.

In other words, according to the present disclosure, it is possible to recover the waste heat generated in the electrical component 15 and the oil cooler 16a while repeating the above-described process, and use the waste heat for interior heating, thereby reducing power consumption and improving overall heating efficiency.

Meanwhile, when the electrical component 15 and the oil cooler 16a are overheated, the coolant line 11 connected to the first radiator 12 is opened and the first branch line 18 is closed, through the operation of the first valve V1.

Thus, the coolant having the temperature that has risen while passing through the electrical component 15 and the oil cooler 16a by the operation of the first water pump 14 is cooled while passing through the first radiator 12 after passing through the heater 40 provided in the coolant line 11, and is again introduced into the electrical component 15 and the oil cooler 16a through the operation of the first water pump 14.

That is, the coolant passing through the electrical component 15 and the oil cooler 16a absorbs the waste heat from the electric component 15 and the oil cooler 16a such that the temperature thereof increases, and is supplied to the heater 40.

Thereafter, the coolant passing through the heater 40 is cooled while passing through the first radiator 12 through the operation of the first water pump 14.

The coolant that has been completely cooled may recover waste heat while passing through the electrical component 15 and the oil cooler 16a, and at the same time, may efficiently cool the electrical component 15 and the oil cooler 16a.

As a result, the coolant cooled in the first radiator 12 may be supplied to the electrical component 15 and the oil cooler 16a, thereby inhibiting the electrical component 15 and the oil cooler 16a from overheating.

An operation according to a low temperature dehumidification mode of the vehicle in one form of the present disclosure will be described with reference to FIG. 5.

Figure 5:
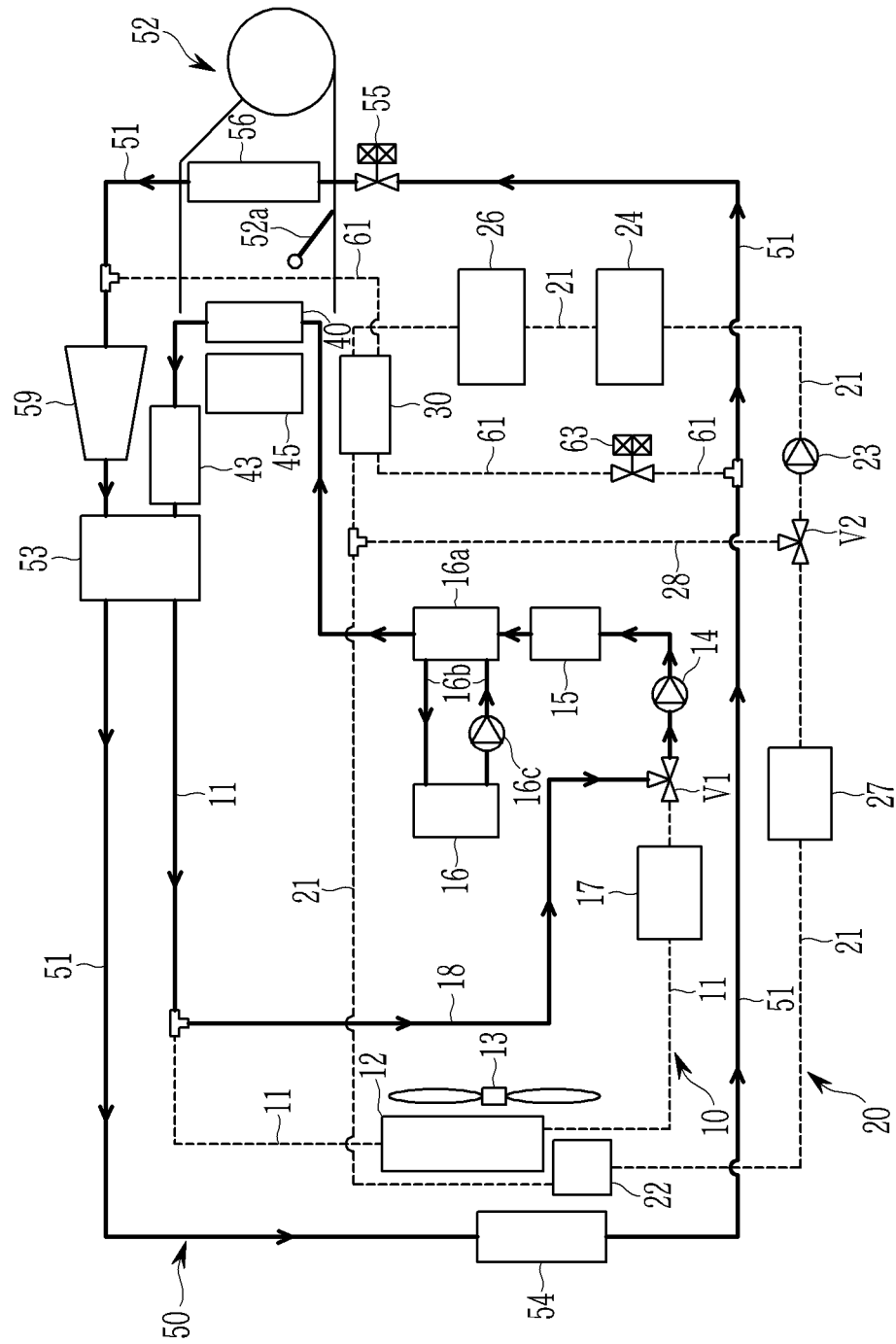
FIG. 5 illustrates an operational state diagram according to a low temperature dehumidification mode in a thermal management system for a vehicle according to one form of the present disclosure.

FIG. 5 illustrates an operational state diagram according to a low temperature dehumidification mode in a thermal management system for a vehicle according to one form of the present disclosure.

Herein, the low temperature dehumidification mode is a mode that operates when dehumidification is desired in the vehicle interior in the heating mode of the vehicle.

Referring to FIG. 5, when the waste heat of the electrical component 15 and the oil cooler 16a are sufficient, the thermal management system may recover the waste heat of the electrical component 15 and the oil cooler 16a and use it for the interior heating of the vehicle.

First, in the cooling apparatus 10, the first water pump 14 is operated for circulation of the coolant.

Herein, the first branch line 18 is opened through the operation of the first valve V1.

In addition, in the cooling apparatus 10, the coolant line 11 connected to the first radiator 12 is closed through the operation of the second valve V2.

Accordingly, on the basis of the first branch line 18, a portion of the coolant line 11 connected to the first radiator 12 and a portion of the coolant line 11 connecting the first radiator 12 and the first reservoir tank 17 are closed through the operation of the first valve V1.

In this state, the coolant passing through the electrical component 15 and the oil cooler 16a may circulate along the opened first branch line 18 and an opened portion of the coolant line 11 without passaging through the first radiator 12 through the operation of the first water pump 14.

Meanwhile, the oil pump 16c operates to supply the motor 16 with the oil cooled in the oil cooler 16a, and the oil line 16b may remain opened by the operation of the oil pump 16c.

Thus, the coolant passing through the electrical component 15 and the oil cooler 16a continuously circulates along the opened coolant line 11 and the opened first branch line 18 without passing through the first radiator 12, and absorbs the waste heat from the electrical component 15 and the oil cooler 16a such that the temperature is increased.

The coolant having the temperature that has been raised is supplied to the heater 40 along the opened coolant line 11 through the operation of the first water pump 14 without passing through the first radiator 12.

Herein, the second coolant heater 43 is operated when the temperature of the coolant circulating along the coolant line 11 is lower than the target temperature, so that the coolant circulating in the coolant line 11 may be heated.

On the other hand, when the air heater 45 is applied instead of the second coolant heater 43, the air heater 45 may be selectively operated depending on the temperature of the outside air passing through the heater 40.

That is, the air heater 45 may be operated when the temperature of the outside air passing through the heater 40 is lower than a target temperature, thereby heating the outside air flowing into the interior of the vehicle.

The air heater 45 is operated when the temperature of the outside air that has completed heat exchange with the high-temperature coolant while passing through the heater 40 is lower than a set temperature or a target heating temperature.

When the air heater 45 is operated, the outside air may be heated while passing through the air heater 45, to be introduced into the vehicle interior in a state where the temperature is raised.

Meanwhile, the high-temperature coolant supplied to the heater 40 performs heat exchange with the outside air, and then is introduced into the coolant line 11.

Thereafter, the coolant is again introduced into the electrical component 15 and the oil cooler 16a along the opened coolant line 11 and the opened first branch line 18 without passing through the first radiator 12.

Meanwhile, in the battery cooling apparatus 20, the second water pump 23 is deactivated.

Meanwhile, in the air conditioner 50, each constituent element operates to dehumidification the interior of the vehicle.

Thus, the refrigerant circulates along the refrigerant line 51.

Herein, the refrigerant line 51 connecting the condenser 53 and the evaporator 56 is opened through the operation of the first expansion valve 55.

The refrigerant connection line 61 is closed through the operation of the second expansion valve 63.

Herein, the first expansion valve 55 may expand the refrigerant supplied from the sub-condenser 54 to the refrigerant line 51 such that the expanded refrigerant is supplied to the evaporator 56.

Accordingly, the expanded refrigerant supplied to the evaporator 56 through the operation of the first expansion valve 55 is supplied to the compressor 59 along the refrigerant line 51 after heat exchanging with the outside air passing through the evaporator 56.

That is, the refrigerant passing through the evaporator 56 may be supplied to the compressor 59. The refrigerant compressed by the compressor 59 with high temperature and high pressure is then introduced into the condenser 53.

Herein, the opening and closing door 52a is opened so that the outside air introduced into the HVAC module 52 and passing through the evaporator 56 passes through the heater 40.

That is, the outside air introduced into the HVAC module 52 is dehumidified while passing through the evaporator 56 by the refrigerant of the low temperature state introduced into the evaporator 56. Next, the outside air is converted into a high temperature state while passing through the heater 40 and introducing into the vehicle interior, thereby heating and dehumidifying the interior of the vehicle.

An operation of the case of heating the battery module 24 will be described with respect to FIG. 6.

Figure 6:
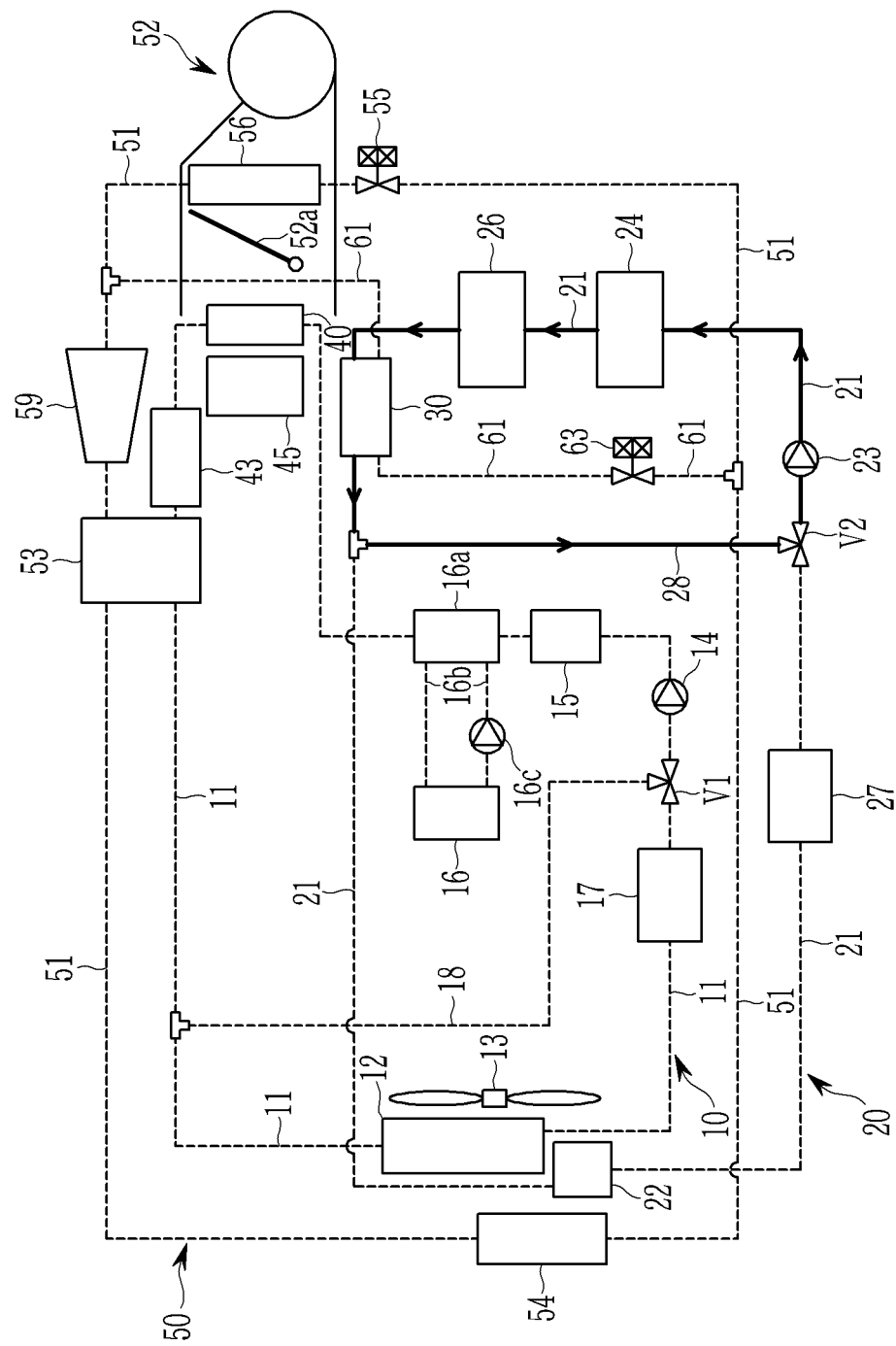
FIG. 6 illustrates an operational state diagram for heating of a battery module in a thermal management system for a vehicle according to one form of the present disclosure.

FIG. 6 illustrates a detailed perspective view for heating a battery module in a thermal management system for a vehicle according to one form of the present disclosure.

Referring to FIG. 6, the cooling apparatus 10 and the air conditioner 50 are deactivated.

The second branch line 28 is opened through the operation of the second valve V2.

In addition, a portion of the battery coolant line 21 connected to the second radiator 22 is closed through the operation of the second valve V2.

That is, on the basis of the second branch line 28, the battery coolant line 21 connected to the second radiator 22 and the battery coolant line 21 connecting the second radiator 22 and the second valve V2 are closed.

In this state, the second water pump 23 is operated to increase the temperature of the battery module 24.

As a result, in the battery cooling apparatus 20, the coolant passing through the chiller 30 along the opened second branch line 28 and the opened battery coolant line 21 is supplied to the battery module 24 through the operation of the second water pump 23.

Herein, the coolant passing through the battery module 24 may be circulated along the opened second branch line 28 and the opened battery coolant line 21 through the operation of the second water pump 23 without passing through the second radiator 22.

The first coolant heater 26 is operated to heat the coolant supplied to the battery module 24 along the open battery coolant line 21.

Then, the coolant circulating in the battery coolant line 21 rises in temperature as it passes through the first coolant heater 26. Accordingly, the coolant having an increased temperature while passing through the first coolant heater 26 may be supplied to the battery module 24, to raise the temperature of the battery module 24.

As a result, according to the present disclosure, it is possible to rapidly increase the temperature of the battery module 24 while repeating the above-described process, thereby efficiently managing the temperature of the battery module 24.

Thus, if the thermal management system for the vehicle according to one form of the present disclosure as described above is applied, the temperature of the battery module 24 may be adjusted depending on the mode of the vehicle by using one chiller 30 for performing heat exchange between the coolant and the refrigerant, and the interior of the vehicle may be heated by using the coolant, thereby simplifying the entire system.

According to the present disclosure, it is also possible to improve the heating efficiency by recovering waste heat from the electrical component 15 and using it for interior heating.

In addition, according to the present disclosure, it is possible to improve the performance of the battery module 24 by efficiently controlling the temperature of the battery module 24, and increase an overall travel distance of the vehicle through efficient management of the battery module 24.

The present disclosure also improves the condensing or evaporation performance of the refrigerant by using the condenser 53 and the sub-condenser 54, thereby improving the cooling performance and reducing the power consumption of the compressor 59.

Further, the entire system may be simplified to reduce manufacturing cost and weight, and to improve space utilization.

While this disclosure has been described in connection with what is presently considered to be practical exemplary forms, it is to be understood that the disclosure is not limited to the disclosed forms. On the contrary, it is intended to cover various modifications and equivalent arrangements.

DESCRIPTION OF SYMBOLS

10: cooling apparatus
11: coolant line
12, 22: first, and second radiators
13: cooling fan
14, 23: first, and second water pumps
15: electrical component
16: motor
16a: oil cooler
16b: oil line
16c: oil pump
17, 27: first, and second reservoir tanks
18: first branch line
20: battery cooling apparatus
21: battery coolant line
24: battery module
26: first coolant heater
28: second branch line
30: chiller
40: heater
43: second coolant heater
45: air heater
50: air conditioner
51: refrigerant line
52: HVAC module
53: condenser
54: sub-condenser
55, 63, 66: first, and second expansion valves
56: evaporator
59: compressor
61: refrigerant connection line
V1, V2: first, and second valves

What is claimed is:

1. A thermal management system for a vehicle, the thermal management system comprising:
   a cooling apparatus configured to circulate a coolant through a coolant line and cool at least one electrical component, the cooling apparatus including a first radiator, a first water pump, and an oil cooler configured to cool at least one motor, wherein the coolant line is configured to connect the first radiator to the first water pump;
   a battery cooling apparatus configured to circulate the coolant to a battery module, and including a second radiator, a second water pump and the battery module connected to each other by a battery coolant line;
   a chiller provided in the battery coolant line connected to a refrigerant line of an air conditioner through a refrigerant connection line, and configured to allow the coolant to pass through an interior of the chiller and adjust a coolant temperature by heat-exchanging a selectively received coolant with a refrigerant supplied from the air conditioner;
   a heater provided in the coolant line between the at least one electrical component and the first radiator, and configured to heat a vehicle interior by using the coolant supplied from the cooling apparatus; and
   a first branch line provided in the coolant line between the first radiator and the first water pump, and connected to the coolant line between the oil cooler and the first radiator through a first valve
   wherein the air conditioner includes a condenser that is connected to the coolant line and is configured to pass the coolant circulating through the cooling apparatus.

2. The thermal management system of claim 1, wherein the air conditioner further includes:
   an air conditioning module including a door that is connected to the refrigerant line, and is configured to adjust an ambient air that has passed through an evaporator and selectively introduce the ambient air into the heater depending on cooling, heating, and dehumidification modes of the vehicle;
   a condenser provided in the coolant line between the first radiator and the heater, and configured to circulate a coolant therein and perform heat exchange between the coolant and a refrigerant supplied through the refrigerant line;
a compressor connected through the refrigerant line and provided between the evaporator and the condenser;
a sub-condenser provided in the refrigerant line between the condenser and the evaporator;
a first expansion valve provided in the refrigerant line between the sub-condenser and the evaporator; and
a second expansion valve provided in the refrigerant connection line.

3. The thermal management system of claim 2, wherein when cooling the battery module by the refrigerant, the second expansion valve is configured to expand the refrigerant introduced through the refrigerant connection line and to supply the refrigerant to the chiller.

4. The thermal management system of claim 2, wherein the refrigerant connection line includes:
a first end connected to the refrigerant line between the sub-condenser and the first expansion valve; and
a second end connected to the refrigerant line between the evaporator and the compressor.

5. The thermal management system of claim 2, wherein the chiller and the condenser are water-cooled heat exchangers, and the sub-condenser is an air-cooled heat exchanger.

6. The thermal management system of claim 2, further comprising:
an air heater configured to selectively heat outside air passing through the heater, wherein the heater is provided between the air heater and the evaporator.

7. The thermal management system of claim 6, wherein the air heater is configured to raise a temperature of the outside air passing through the heater when a temperature of the coolant supplied to the heater is lower than a target temperature.

8. The thermal management system of claim 2, further comprising:
a second branch line provided in the battery coolant line and configured to connect the chiller and the battery module through the second valve.

9. The thermal management system of claim 8, wherein when the battery module is cooled in the cooling mode of the vehicle or when the battery module is heated,
the second valve is configured to close the battery coolant line connected to the second radiator, open the second branch line, and inhibit the coolant that has passed through the battery module from passing through the second radiator.

10. The thermal management system of claim 8, wherein when cooling the at least one electrical component and the battery module by using the coolant:
the first valve is configured to close the first branch line;
the second valve is configured to close the second branch line;
the air conditioner is deactivated;
the first water pump is configured to supply the coolant cooled in the first radiator to the at least one electrical component and the oil cooler along the coolant line; and
the second water pump is configured to supply the coolant cooled in the second radiator to the battery module along the battery coolant line.

11. The thermal management system of claim 8, wherein when the battery module is cooled in the cooling mode of the vehicle:
in the cooling apparatus, the first water pump is configured to circulate the coolant in the coolant line;
the first valve is configured to close the first branch line;
the second valve is configured to open the second branch line;
in the battery cooling apparatus, the second water pump is configured to supply the coolant passing through the chiller to the battery module along the second branch line and an opened portion of the battery coolant line without supplying the coolant through the second radiator;
in the air conditioner, the first expansion valve is configured to open the refrigerant line connecting the sub-condenser and the evaporator;
the expansion valve is configured to open the refrigerant connection line;
the first expansion valve is configured to expand the refrigerant supplied to the refrigerant line and supply the expanded refrigerant to the evaporator; and
the second expansion valve is configured to expand the refrigerant supplied to the refrigerant connection line and supply the expanded refrigerant to the chiller.

12. The thermal management system of claim 11, wherein:
the first water pump is configured to supply the coolant from the cooling apparatus to the condenser,
the condenser is configured to condense the refrigerant through heat exchange with the coolant, and
the sub-condenser is configured to additionally condense the refrigerant introduced from the condenser through heat exchange with the outside air.

13. The thermal management system of claim 8, wherein when performing the dehumidification mode of the vehicle:
the first valve is configured to open the first branch line and to close the coolant line connected to the first radiator;
the second valve is configured to close the second branch line;
the first water pump is configured to supply the coolant that has passed through the at least one electrical component and the oil cooler to the heater along the opened first branch line and the opened coolant line without supplying the coolant through the first radiator;
the coolant discharged from the heater is again introduced into the at least one electrical component and the oil cooler along the opened coolant line and the first branch line;
the battery cooling apparatus is deactivated;
the first expansion valve is configured to circulate the refrigerant in the opened refrigerant line, expand the refrigerant, and supply the expanded refrigerant to the evaporator; and
the second expansion valve is configured to close the refrigerant connection line.

14. The thermal management system of claim 8, wherein: when the battery module is heated:
the cooling apparatus is deactivated;
the second valve is configured to open the second branch line; and
in the battery cooling apparatus, the second water pump is configured to circulate the coolant passing through the chiller to the battery module along the second branch line and an opened portion of the battery coolant line without circulating the coolant through the second radiator.

15. The thermal management system of claim 1, wherein when using waste heat of the at least one electrical component in a heating mode of the vehicle:

the first valve is configured to open the first branch line and close the coolant line connected to the first radiator;

the first water pump is configured to supply the coolant that has passed through the at least one electrical component and the oil cooler to the heater along the opened first branch line and the opened coolant line without supplying the coolant through the radiator; and the coolant discharged from the heater is supplied to the at least one electrical component and the oil cooler along the opened coolant line and the first branch line.

16. The thermal management system of claim 1, wherein the battery cooling apparatus further includes a first coolant heater provided in the battery coolant line between the battery module and the chiller.

17. The thermal management system of claim 16, wherein, when the battery module is heated, the first coolant heater is configured to heat the coolant supplied to the battery module along the battery coolant line.

18. The thermal management system of claim 1, further comprising:

an oil pump provided on an oil line and configured to operate when cooling the at least one motor or recovering waste heat generated from the at least one motor, wherein the at least motor is connected to the oil cooler through the oil line.

19. The thermal management system of claim 1, wherein the at least one electrical component includes: an electric power control unit (EPCU), an inverter, an on board charger (OBC), a power converter, or an autonomous driving controller.

20. The thermal management system of claim 1, further comprising:

a second coolant heater provided in the coolant line between the heater and the condenser, and configured to heat the coolant supplied to the heater along the coolant line when a temperature of the coolant supplied to the heater is lower than a target temperature.

* * * * *